US012732443B2

(12) United States Patent
Cho et al.

(10) Patent No.: US 12,732,443 B2
(45) Date of Patent: Sep. 8, 2026

(54) SYSTEMS AND METHODS FOR KEY PERFORMANCE INDICATOR REPORTING BY USER EQUIPMENT DEVICES IN CELLULAR WIRELESS NETWORKS

(71) Applicant: Verizon Patent and Licensing Inc., Basking Ridge, NJ (US)

(72) Inventors: Yong Sang Cho, Old Tappan, NJ (US); Lily Zhu, Parsippany, NJ (US); Balaji L. Raghavachari, Bridgewater, NJ (US); Vijayakrishna P. Guduru, Denville, NJ (US); Bharadwaj Vemuri, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 18/912,235

(22) Filed: Oct. 10, 2024

(65) Prior Publication Data

US 2026/0106815 A1 Apr. 16, 2026

(51) Int. Cl.
*H04L 43/08* (2022.01)
*H04L 41/142* (2022.01)
*H04L 41/5009* (2022.01)

(52) U.S. Cl.
CPC ............ *H04L 43/08* (2013.01); *H04L 41/142* (2013.01); *H04L 41/5009* (2013.01)

(58) Field of Classification Search
CPC .... H04L 41/142; H04L 41/5009; H04L 43/08
See application file for complete search history.

(56) References Cited

U.S. PATENT DOCUMENTS

2019/0149425 A1* 5/2019 Larish .................. H04L 41/145
706/16
2022/0053312 A1* 2/2022 Yin ...................... H04W 24/02
2023/0156620 A1* 5/2023 Khafizov ............. H04W 24/10
455/522
2025/0126512 A1* 4/2025 Khirallah ........... H04W 52/367

* cited by examiner

*Primary Examiner* — Gil H. Lee

(57) ABSTRACT

A device may include a processor configured to select user equipment (UE) devices associated with a user group and a device type, wherein the UE devices connect to a core network via a Radio Access Network (RAN). The processor may be further configured to select key performance indicator (KPI) parameters to be collected by particular ones of the plurality of UE devices; instruct the UE devices to report values for the KPI parameters; obtain the reported values for the KPI parameters from the UE devices; and perform a Self-Organizing Network (SON) action to change a configuration of the RAN based on the obtained values for the plurality of KPI parameters. When performing the SON action, the processor may be configured to execute the SON action by the device or to send an instruction to a SON system to perform the SON action.

20 Claims, 9 Drawing Sheets

800

| | | |
|---|---|---|
| USER GROUP 810 | | CONSUMER CUSTOMERS |
| DEVICE TYPE 820 | | MOBILE BROADBAND UE DEVICES |
| OPERATIONAL KPIs 830 | EVENT TRIGGERED 832 | RSRP/SINR FOR COMPONENT CARRIERS |
| | | PUSCH/PUCCH TRANSMISSION POWER |
| | | ARFCN FOR COMPONENT CARRIERS |
| | | BOOT TIME |
| | | MODEM CRASH EVENT |
| | | MODEM ONLINE/OFFLINE EVENT |
| | | USER PLANE DATA FAILURE |
| | COUNTER TRIGGERED 834 | PERCENTAGE OF TIME OF 5G SA SERVICE |
| | | PERCENTAGE OF TIME OF 5G NSA SERVICE |
| | | PERCENTAGE OF TIME OF 4G ONLY SERVICE |
| WELLNESS KPIs 840 | EVENT TRIGGERED 842 | PERCENTAGE OF TIME OF LIMITED SERVICE |
| | | PERCENTAGE OF TIME OF NO SERVICE |
| EFFICIENCY KPIs 850 | COUNTER TRIGGERED 852 | DL/UL USER PERCEIVED THROUGHPUT |
| | | Rx PERCENTAGE FOR COMPONENT CARRIERS |
| | | RANK INDICATOR FOR COMPONENT CARRIERS |
| | | DL/UL MIMO ASSIGNMENT FOR COMPONENT CARRIERS |
| | | DL/UL MODULATION FOR COMPONENT CARRIERS |

| | | |
|---|---|---|
| USER GROUP 910 | | TESTING |
| DEVICE TYPE 920 | | MOBILE BROADBAND AND FWA |
| OPERATIONAL KPIs 930 | EVENT TRIGGERED 932 | RSRP/SINR |
| | | RAT TYPE |
| | | BOOT TIME |
| | | REGISTRATION FAILURE |
| | | CALL SETUP FAILURE |
| | | MODEM CRASH EVENT |
| | | PDU SETUP FAILURE RATE |
| | | USER PLATE DATA FAILURE RATE |
| WELLNESS KPIs 940 | EVENT TRIGGERED 942 | MCS |
| | | CQI |
| | | RANK INDICATOR |
| | | CARRIER AGGREGATION |
| | COUNTER TRIGGERED 944 | COUNTERS |
| | | PERCENTAGE OF TIME OF SERVICE |
| EFFICIENCY KPIs 950 | EVENT TRIGGERED 952 | DL/UL USER PERCEIVED THROUGHPUT |
| | | CARRIER AGGREGATION |
| | | MIMO |
| | | SPECTRUM UTILIZATION |

FIG. 9

SYSTEMS AND METHODS FOR KEY PERFORMANCE INDICATOR REPORTING BY USER EQUIPMENT DEVICES IN CELLULAR WIRELESS NETWORKS

BACKGROUND INFORMATION

To satisfy the needs and demands of users of mobile communication devices, providers of wireless communication services continue to improve and expand available services as well as networks used to deliver such services. One aspect of such improvements includes monitoring the performance of the network and/or device connected to the network. Monitoring the performance of a large number of devices in a network may pose various difficulties.

BRIEF DESCRIPTION OF THE DRAWINGS

FIG. 8 illustrates a first exemplary set of UE device KPIs according to an implementation described herein; and FIG. 9 illustrates a second exemplary set of UE device KPIs according to an implementation described herein.

DETAILED DESCRIPTION OF PREFERRED EMBODIMENTS

Figure 1:
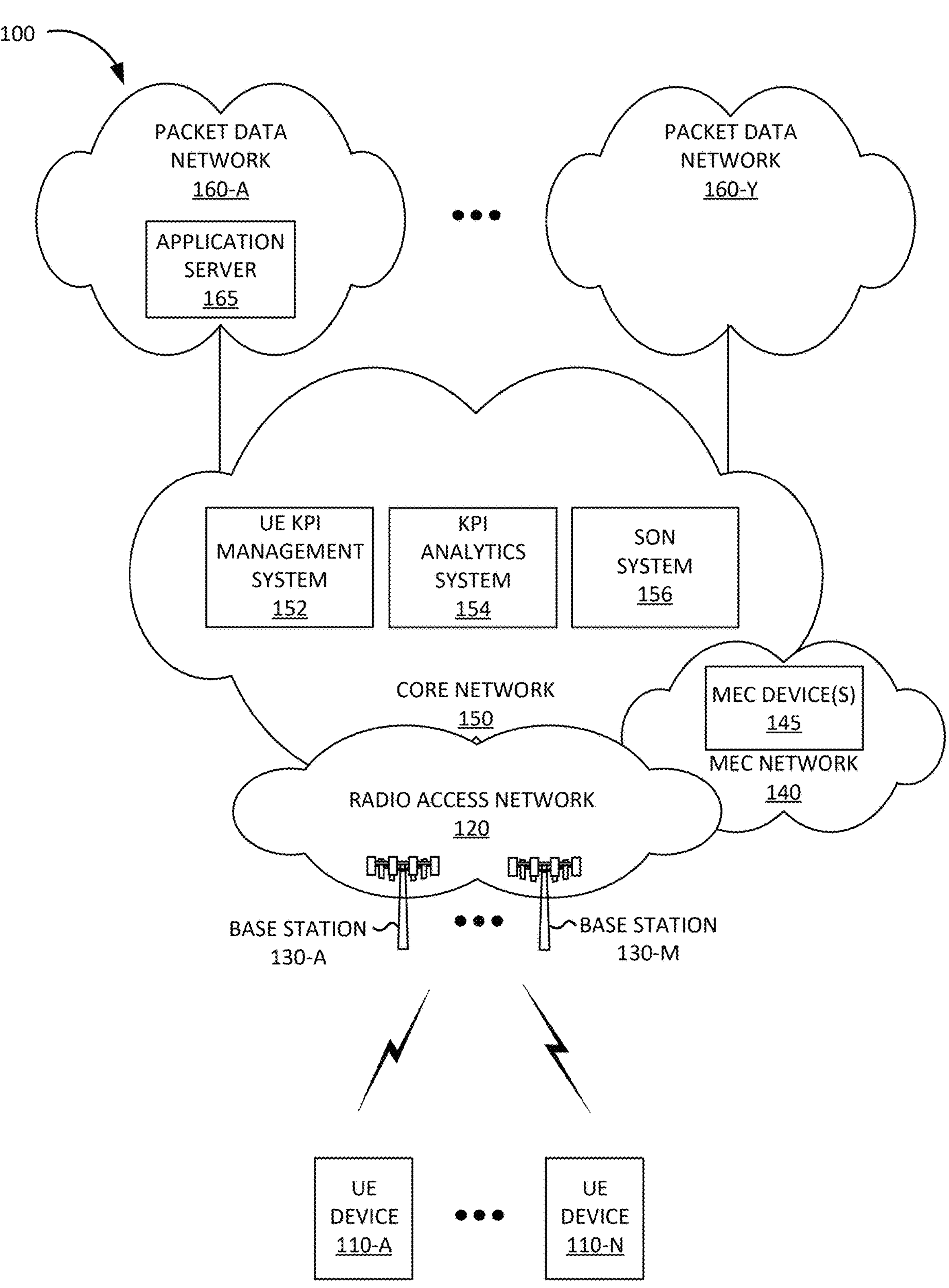
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable wireless communication devices (e.g., smart phones, etc.), referred to as user equipment (UE) devices (also herein referred to as UEs), to connect to networks and obtain services via the provider's core network, such as a Fourth Generation (4G) core network, a Fifth Generation (5G) core network, and/or other next generation networks as defined by the 3$^{rd}$ Generation Partnership Project (3GPP). 5G coverage may be provided using 5G base stations, referred to as gNodeBs, that implement the 5G New Radio (NR) air interface. In order to establish a communication session, a UE device may establish a Protocol Data Unit (PDU) session with the core network via the RAN. The UE device may then establish one or more data flows in the PDU session. Each data flow may be associated with a Quality of Service (QoS) and/or other types of service requirements.

A provider may need to monitor the performance of a network and/or devices using the network. The provider may configure network devices to collect values for Key Performance Indicators (KPIs). For example, devices that collect and monitor KPI values to characterize the performance of a core network, RAN, and/or UE devices connected to the core network via the RAN may include network functions (NFs) in a core network, base stations in the RAN, and/or transport network devices such as routers and switches. However, KPI values collected by devices in the core network and/or RAN may not give sufficient information relating to the capacity, coverage, mobility scenarios, and/or user experience. Furthermore, KPI values collected by devices in the core network and/or RAN may provide averaged information that does not provide sufficient granularity with respect to different types of UE devices and/or different groups of users of UE devices.

Implementations described herein relate to systems and methods for KPI reporting by UE devices in cellular wireless networks and using the reported KPI information to improve network performance. A UE device KPI management system (UKMS) may be configured to select a set of KPIs for a set of UE devices associated with a device type and classified in a user group and to instruct the set of UE devices to report values for the set of selected KPIs.

For example, the UKMS may be configured to define a user group and select a device type. The UKMS may then identify a set of UE devices, connected to a core network via a RAN, associated with the defined user group and selected device type. The UKMS may be further configured to select the identified set of UE devices, select a set of KPIs for which values are to be collected by each of the selected UE devices, and instruct the UE device to report values for the selected KPI parameters. The UKMS may then obtain the reported values for the KPI parameters from the UE devices and perform a Self-Organizing Network (SON) action to change a configuration of the RAN or the core network based on the obtained values for the plurality of KPI parameters. In some implementations, performing the SON action may include executing the SON action by the UKMS. In other implementations, performing the SON action may include sending an instruction to a SON system to perform the SON action.

The SON action may include an action to change a configuration of the RAN, such as, for example, adjusting a tilt parameter for an antenna of a base station, instructing a base station to enter a power saving mode, adjust power allocation for a base station, instruct a base station to switch to using a different frequency band, adjust a handover control parameter, load balance traffic between different frequency bands of a base station, perform interference mitigation between UE devices and/or base stations, adjust a carrier aggregation parameter, identify an error state or an outage associated with a base station, and/or perform another type of SON action.

The SON action may include an action to change a configuration of the core network, such as, for example, deploying additional instances of a microservice for a network function (NF), deploying a new instance of an NF, detecting an outage of an NF, detecting outage of a link in the core network, routing a data flow and/or a PDU session to a different destination, and/or perform another type of SON action. Additionally, or alternatively, the SON action may include sending an instruction to a UE device to perform an action, such as, for example, instructing the UE device to adjust an antenna parameter, enter a power saving mode, update an application, update a UE Route Selection Policy (URSP), request to connect to a different network slice, adjust a handover control parameter, and/or perform another type of action.

The UKMS may further provide the obtained KPI values for a statistical analysis of the user group and device type. The statistical analysis may be used, for example, to perform anomaly detection based on the obtained KPI values, to compare the obtained KPI values with a set of KPI values obtained by the core network, to identify a trend in operational performance, wellness, and/or efficiency, generate a test report based on a testing group of UE devices, and/or to perform a different type of analysis.

The UE devices associated with the defined user group may include, for example, UE devices provided to employees of an organization, UE devices that have installed a particular application, UE devices located in a geographic location, UE devices associated with a testing group, and/or UE devices associated with a different type of defined user group.

The device type may include, for example, all mobile broadband UE devices, mobile broadband UE devices using a particular mobile operating system, fixed wireless access devices, Internet of Things (IoT) devices, laptop computer devices with cellular wireless communication capability, unmanned aerial drone (UAV) devices, mass transit wireless access devices, and/or other types of UE devices.

Selecting the set of KPIs may include selecting a set of operational KPIs to characterize operation of a radio frequency (RF) air interface, selecting a set of wellness KPIs to characterize a wellness of the RF air interface, and selecting a set of efficiency KPIs to characterize an efficiency of the RF air interface.

Furthermore, instructing the UE devices to report values for the KPIs may include selecting one or more trigger events for recording a value for a particular KPI and selecting a reporting criterion for the particular KPI. The reporting criterion may correspond to the one or more trigger events or may correspond to a value of the counter that is incremented each time the one or more trigger events is detected. In other words, a KPI may be event-based, in which a KPI value is reported in response to a specified event (e.g., a threshold being reached; an error status being detected; a change in connectivity, software, or user activity; etc.), or counter-based, in which KPI values are recorded based on detected events and in which a counter is maintained each time a KPI value is recorded. For counter-based KPIs, KPI values may be reported when the counter reaches a particular value or at particular time intervals.

Moreover, the one or more trigger events to record a KPI value and/or to report a KPI value may include a conditional event that needs to be satisfied to record and/or report a KPI value. The conditional events may include a user permission setting associated with a UE device, a battery status associated with the UE device, an activity level associated with the UE device, and/or another type of conditional event.

FIG. 1 is a diagram of an exemplary environment 100 in which the systems and/or methods described herein may be implemented. As shown in FIG. 1, environment 100 may include UE devices 110-A to 110-N (collectively referred to as "UE devices 110" and individually as "UE device 110"), a RAN 120 that includes base stations 130-A to 130-M (collectively referred to as "base stations 130" and individually as "base station 130"), a Multi-Access Edge Computing (MEC) network 140, a core network 150, and packet data networks (PDNs) 160-A to 160-Y (collectively referred to as "PDNs 160" and individually as "PDN 160").

UE device 110 may include any mobile device with cellular wireless communication functionality. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, a portable gaming system, and/or another type of portable computer; a Fixed Wireless Access (FWA) device; an IoT device; a UAV device; a mass transit wireless access device; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

RAN 120 may be managed by a provider of wireless communication services. RAN 120 may include base stations 130 that enable UE devices 110 to connect to core network 150 using cellular wireless signals. For example, RAN 120 may include one or more central units (CUs), distributed units (DUs), and/or Radio Units (RUs) (not shown in FIG. 1) that enable and manage connections from UE devices 110 to core network 150. RAN 120 may include features associated with an LTE Advanced (LTE-A) network, a 5G network, and/or other next generation network. Such features may include carrier aggregation; advanced or massive MIMO configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 130 may include a 5G NR base station (e.g., a gNodeB) and/or a 4G Long Term Evolution (LTE) base station (e.g., an eNodeB). Base stations 130 may include devices and/or components configured to enable cellular wireless communication with UE devices 110. For example, base stations 130 may include an RF transceiver configured to communicate with UE devices 110 using a 5G NR air interface using a 5G NR protocol stack, a 4G LTE air interface using a 4G LTE protocol stack, and/or using another type of cellular air interface.

MEC network 140 may be associated with RAN 120 and may provide MEC services for UE devices 110 attached to base stations 130. MEC network 140 may be in proximity to base stations 130 from a geographic and network topology perspective, thus enabling low latency services to be provided to UE devices 110. As an example, MEC network 140 may be located on the same site as base station 130. As another example, MEC network 140 may be geographically closer to one of base stations 130 and reachable via fewer network hops and/or fewer switches, than other macro cell base stations 130.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services.

Core network 150 may be managed by the provider of cellular wireless communication services and may manage communication sessions of subscribers connecting to core network 150 via RAN 120 and/or another network (e.g., a WLAN). For example, core network 150 may establish an Internet Protocol (IP) connection between UE devices 110 and PDN 160. The components of core network 150 may be implemented as dedicated hardware components and/or as Virtual Network Functions (VNFs) implemented on top of a common shared physical infrastructure using Software Defined Networking (SDN). For example, an SDN controller may implement one or more of the components of core network 150 using an adapter implementing a VNF virtual machine, a Cloud-Native Network Function (CNF) container, an event driven serverless architecture, and/or another type of SDN architecture. The common shared physical infrastructure may be implemented using one or more devices 300 described below with reference to FIG. 3 in a cloud computing center associated with core network 150. Additionally, or alternatively, at least some of the components of core network 150 may be implemented using MEC devices 145 in MEC network 140.

Core network 150 may include a UKMS 152, a KPI analytics system 154, and a SON system 156. UKMS 152 may obtain UE KPI values from UE devices 110, based on a set of KPIs and recording and/or reporting trigger conditions, selected for a set of UE devices 110 associated with a user group and a device type. UKMS 152 may provide the obtained KPI values to KPI analytics system 154 for analysis. KPI analytics system 154 may compare and/or correlate the obtained UE KPI values with a set of KPI values obtained by the core network, perform anomaly detection based on the obtained KPI values to identify a network anomaly, identify a trend in operational performance, wellness, and/or efficiency, generate a test report based on a testing group of UE devices, and/or perform a different type of analysis using the obtained UE KPI values. SON system 156 may perform self-organization, self-optimization, and/or self-healing functions for RAN 120 and/or core network 150 based on information obtained from UKMS 152. In some implementations, UKMS 152, KPI analytics system 154, and SON system 156 may each be implemented as separate systems enabled to communicate with each other. In other implementations, UKMS 152 may include one or both of KPI analytics system 154 and/or SON system 156.

PDNs 160-A to 160-Y may each be associated with a Data Network Name (DNN) in 5G, and/or an Access Point Name (APN) in 4G. UE device 110 may request a connection to PDN 160 using a DNN or an APN. For example, UE device 110 may request a data flow connection to an application server 165 (shown in PDN 160-A). PDN 160 may include, and/or be connected to, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks. PDN 160 may include application server 165. Application server 165 may include one or more computer devices that host one or more applications and/or services used by UE device 110. Core network 150 may establish a data flow session between UE device 110 and application server 165 via RAN 120.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, in another implementation, UKMS 152 and/or KPI analytics system 154 may be implemented in application server 165. In yet other implementation, UKMS 152 and/or KPI analytics system 154 may be implemented in MEC device 145.

Figure 2:
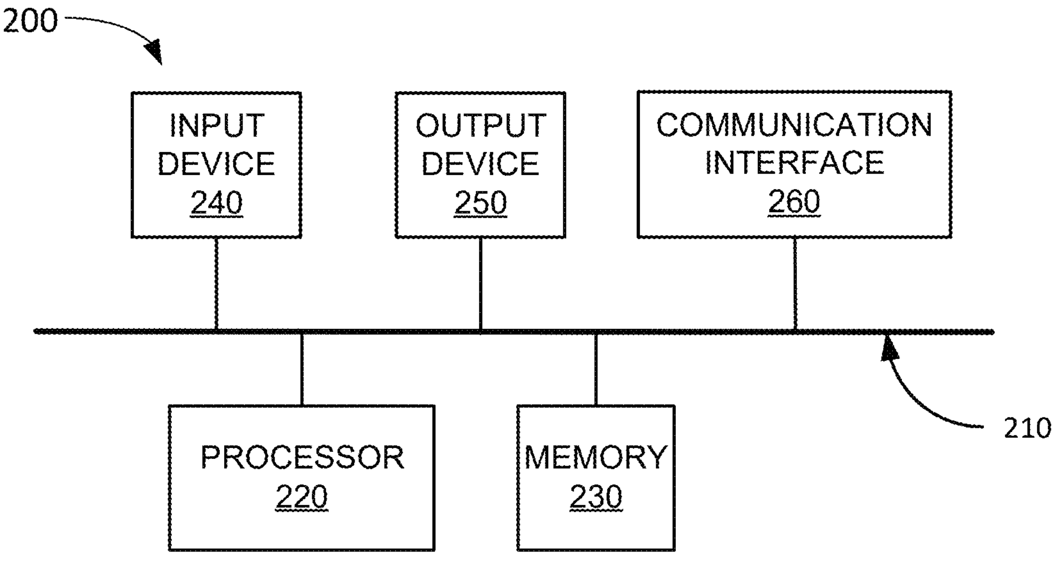
FIG. 2 illustrates exemplary components of a device that may be included in an environment according to an implementation described herein.

FIG. 2 is a diagram illustrating example components of a device 200 according to an implementation described herein. The components of FIG. 1 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to selecting UE KPIs for a user group and device type and obtain values for the selected KPIs from UE devices 110 associated with the user group and device type. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
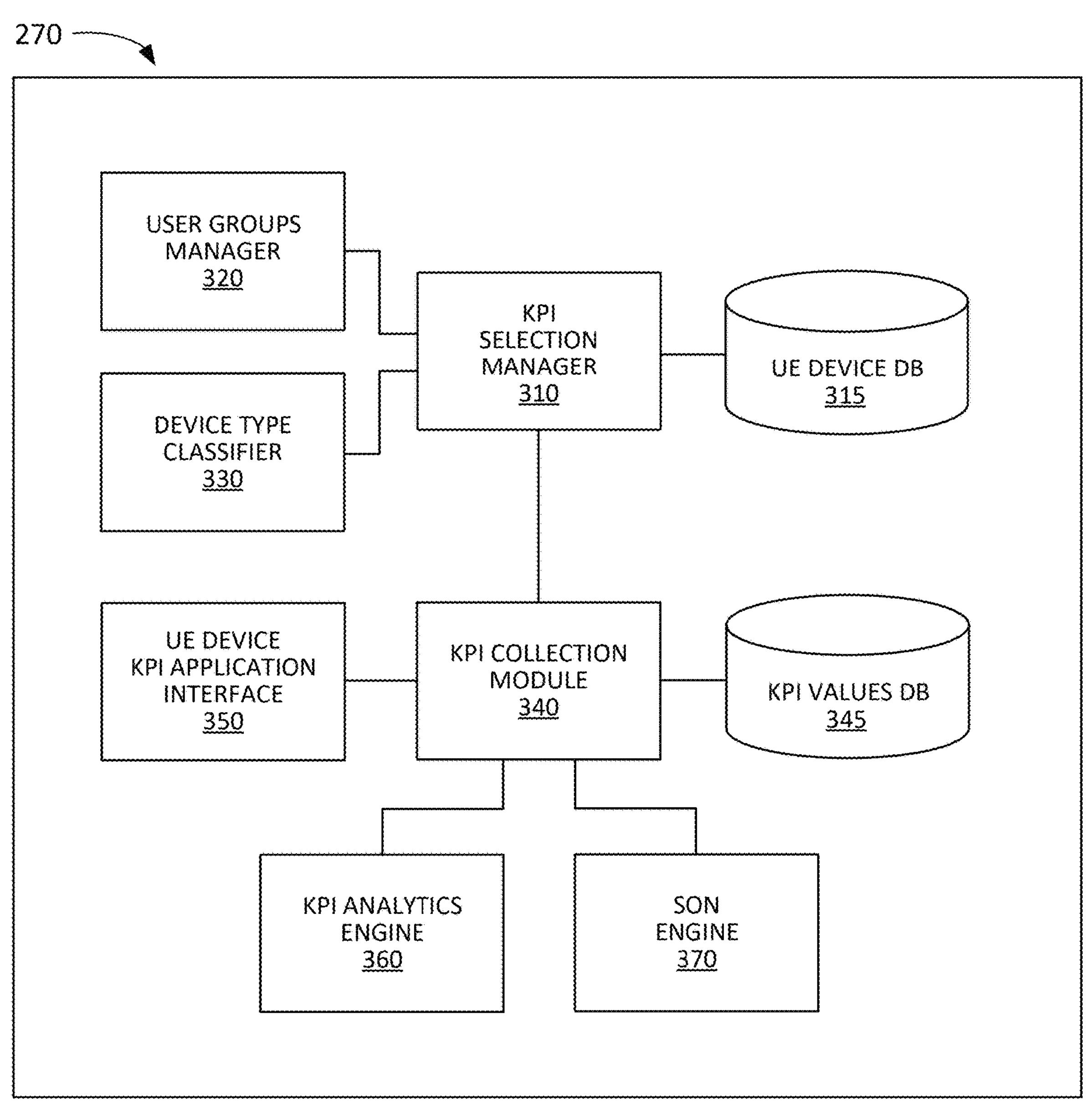
FIG. 3 illustrates exemplary components of a User Equipment (UE) Key Performance Indicator (KPI) management system according to an implementation described herein.

FIG. 3 illustrates exemplary components of UKMS 152. The components of UKMS 152 may be implemented, for example, via processor 220 executing instructions from memory 230. For example, one or more components of UKMS 152 may correspond to the structure of processor 220 together with instructions in memory 230 for implementing the functionality of the components. Alternatively, some or all of the components of UKMS 152 may be implemented via hard-wired circuitry. For example, one or more components of UKMS 152 may correspond to the structure of some or all of an ASIC, FPGA, and/or another type of integrated circuit. As shown in FIG. 3, UKMS 152 may include a KPI selection manager 310, a UE device database (DB) 315, a user groups manager 320, a device type classifier 330, a KPI collection module 340, a KPI values DB 345, a UE device KPI application interface 350, a KPI analytics engine 360, and a SON engine 370.

KPI selection manager 310 may select a set of KPIs for a group of UE devices 110 defined by a user group and a device type, using information stored in UE device DB 315. UE device DB 315 may store information relating to UE devices 110. Exemplary information that may be stored in UE device DB 315 is described below with reference to FIG. 4.

User groups manager 320 may manage user groups. For example, user groups manager 320 may define a user group and identify UE devices 110 associated with the user group. A user group may include employees of an enterprise, government agency, and/or another type of organization and provided with UE device 110 by the organization; users of a particular application installed on UE device 110; users with UE devices 110 located within a delineated geographic area; users associated with a testing group, selected by the provider that manages core network 150 and/or RAN 120, provided with UE devices 110 that include a testing application configured to test the performance of UE devices 110; and/or another type of user group.

User groups manager 320 may select a set of KPIs for a user group. Different user groups may be assigned different sets of UP KPIs. For example, a consumer user group may be assigned a first set of UE KPIs, an employee user group may be assigned a second set of UE KPIs, and a testing user group may be assigned a third set of UE KPIs. In some implementations, a set of KPIs may be assigned to a user group manually by an administrator of UKMS 152. In other implementations, a set of KPIs may be assigned to a user group automatically based on a set of criteria assigned to the user group. For example, each criterion may be associated with one or more KPIs.

Device type classifier 330 may manage device types. For example, device type classifier 330 may classify UE device 110 into a device type based on one or more criteria, such as device type information stored in a subscription record associated with UE device, a particular application and/or application type used by the UE device 110, a protocol stack used by UE device 110, a QoS class identifier (ID) for a data flow session associated with UE device 110, the pattern of data sent and/or received by UE device 110 (e.g., average packet size, average throughput, packet size variation, etc.), and/or other types of criteria. A device type may include, for example, a mobile broadband device, a mobile broadband device using a particular mobile operating system, a FWA device, an IoT device, a laptop computer device with cellular wireless communication capability, a UAV device, a mass transit wireless access device, and/or another type of device.

Device type classifier 330 may select a set of KPIs for a device type. Different device types may be assigned different sets of UE KPIs. For example, a mobile broadband UE device 110 with an Android® operating system may be assigned a first set of UE KPIs, a mobile broadband UE device 110 with an iOS® operating system may be assigned a second set of UE KPIs, a FWA device may be assigned a third set of UE KPIs, etc. In some implementations, a set of KPIs may be assigned to a device type manually by an administrator of UKMS 152. In other implementations, a set of KPIs may be assigned to a device type automatically based on a set of criteria assigned to the device type. For example, each criterion may be associated with one or more KPIs.

KPI collection module 340 may collect UE KPIs from UE devices 110 using UE device KPI application interface 350. UE device KPI application interface 350 may be configured to communicate with an application installed on UE device 110 and configured to record and report UE KPI values. For example, KPI collection module 340 may, via KPI application interface 350, instruct UE device 110 to report KPI values for a set of UE KPIs based on one or more recording and/or reporting trigger conditions selected for each UE KPI.

Furthermore, KPI collection module 340 may, via KPI application interface 350, receive UE KPI values from UE device 110 and store the received UE KPI values in KPI values DB 345. KPI values DB 345 may store KPI values obtained from UE devices 110. For example, KPI values DB 345 may store a UE KPI record for each UE device 110. Each UE KPI record may store information identifying UE device 110 and UE KPI records for different time periods. For each time period, the UE KPI record may store a set of operational UE KPI values, a set of wellness UE KPI values, and/or a set of efficiency UE KPI values.

KPI analytics engine 360 may use KPI values stored in KPI values DB 345 for statistical analysis of a user group and device type. In some implementations, KPI analytics engine 360 may provide an interface to KPI analytics system 154. In other implementations, KPI analytics engine 360 may include KPI analytics system 154. KPI analytics system 154 may use the received UE KPI values to perform anomaly detection based on the obtained KPI values, compare the obtained KPI values with a set of KPI values obtained by the core network, identify a trend in operational performance, wellness, and/or efficiency, generate a test report based on a testing group of UE devices, and/or perform a different type of analysis.

KPI analytics engine 360 may provide KPI values stored in KPI values DB 345 to SON engine 370. SON engine 370 may analyze the received KPI values and determine a SON action to perform based on the received KPI values. The SON action may include an action to change a configuration of RAN 120, such as, for example, adjusting a tilt parameter for an antenna of base station 130, instructing base station 130 to enter a power saving mode, adjust power allocation for base station 130, instruct base station 130 to switch to using a different frequency band, adjust a handover control parameter used by base station 130, load balance traffic between different frequency bands of base station 130, perform interference mitigation between UE devices 110 and/or base stations 130, adjust a carrier aggregation parameter for base station 130, identify an error state or an outage associated with base station 130, and/or perform another type of SON action.

Furthermore, the SON action may include an action to change a configuration of core network 150, such as, for example, deploying additional instances of a microservice for an NF, deploying a new instance of an NF, detecting an outage of an NF, detecting outage of a link in the core network, routing a data flow and/or a PDU session to a different destination, and/or perform another type of SON action. Additionally, or alternatively, the SON action may include sending an instruction to UE device 110 to perform an action, such as, for example, instructing UE device 110 to adjust an antenna parameter, enter a power saving mode, update an application, update a URSP, request to connect to a different network slice, adjust a handover control parameter, and/or perform another type of action.

In some implementations, SON engine 370 may select a SON action based on a set of predetermined rules that match a set of KPI values, or KPI value ranges, for particular KPI parameters with a particular SON action. Such predetermined rules may be determined by operators with expertise in managing RAN 120 and/or core network 150, based on historical performance of RAN 120 and/or core network 150, and/or based on one or more machine learning models (e.g., deep learning models, reinforcement learning (RL) models, generative adversarial network (GAN) models, etc.) trained to determine an appropriate SON action based on a set of KPI values. The performance of RAN 120 and/or core network 150 may be monitored after the SON action is performed to determine whether the SON action resulted in an improvement based on subsequent received KPI values. If the SON action does not result in an improvement in the performance of RAN 120 and/or core network 150, SON engine 370 may reverse the SON action.

In some implementations, SON engine 370 may provide an interface to SON system 156 and some or all of the functionality described above with respect to SON engine 370 may be performed by SON system 156. In other implementations, SON engine 370 may include SON system 156.

Although FIG. 3 shows exemplary components of UKMS 152, in other implementations, UKMS 152 may include fewer components, different components, additional components, or differently arranged components than depicted in FIG. 3. Additionally, or alternatively, one or more components of UKMS 152 may perform one or more tasks described as being performed by one or more other components of UKMS 152.

Figure 4:
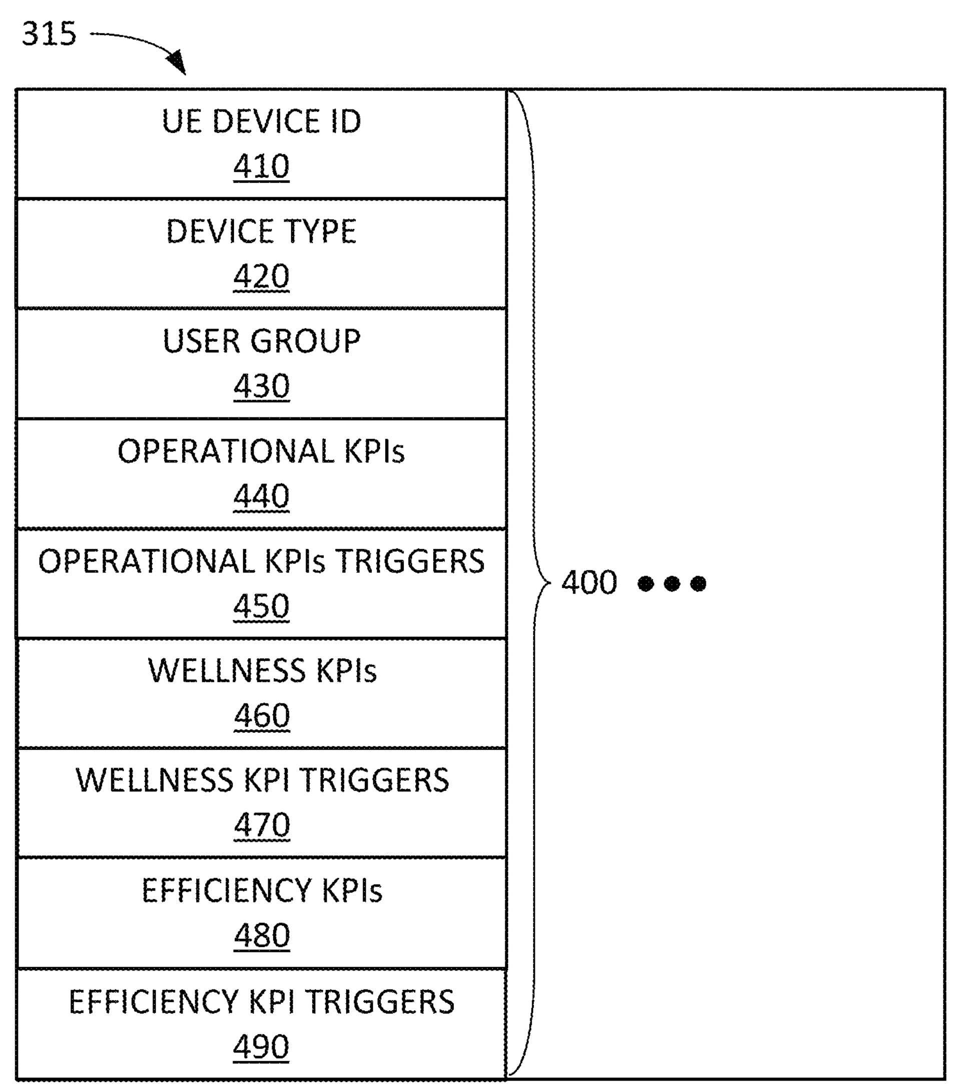
FIG. 4 illustrates exemplary components of a UE device database (DB) according to an implementation described herein.

FIG. 4 illustrates exemplary components of UE device DB 315. As shown in FIG. 4, UE device DB 315 may include one or more UE device records 400. Each UE device record 400 may include information relating to a particular UE device 110. UE device record 400 may include a UE device identifier (ID) field 410, a device type field 420, a user group field 430, an operational KPIs field 440, an operational KPIs triggers field 450, a wellness KPIs field 460, a wellness KPIs trigger field 470, an efficiency KPIs field 480, and an efficiency KPIs triggers field 490.

UE device ID field 410 may store an ID associated with UE device 110 and/or a subscription associated with UE device 110. For example, UE device ID field 410 may store an International Mobile Subscriber Identity (IMSI), a Mobile Directory Number (MDN), a Mobile Station International Subscriber Directory Number (MSISDN), an International Mobile Equipment Identity (IMEI), and/or another type of UE device ID and/or subscription ID.

Device type field 420 may store information identifying a device type associated with UE device 110. For example, device type field 420 may identify UE device 110 as a mobile broadband device, a mobile broadband device using a particular mobile operating system, a FWA device, an IoT device, a laptop computer device with cellular wireless communication capability, a UAV device, a mass transit wireless access device, and/or another type of device.

User group field 430 may identify one or more user groups associated with UE device 110. A user group may be identified using a user group ID associated with an employee user group, an application user group, a location user group, a testing user group, and/or another type of user group. Furthermore, user group field 430 may include a description of each user group associated with UE device 110.

Operational KPIs field 440 may store information identifying one or more operational KPIs that UE device 110 is to be instructed to record and report. The operational KPIs may characterize the operation of the RF air interface of UE device 110. The operational KPIs may include, for example, Reference Signal Received Power (RSRP) and/or Signal to Interference Plus Noise Ratio (SINR) for all component carriers on 4G LTE and/or 5G NR; Physical Uplink Shared Channel (PUSCH) and/or Physical Uplink Control Channel (PUCCH) transmission power; eNodeB and/or gNodeB ID; a version of an operating system and/or modem chipset being used by UE device 110; an Absolute RF Channel Number (ARFCN) for each component carrier on 4G LTE and/or 5G NR; a boot time for UE device 110; modem crash events for UE device 110; modem online/offline events for UE device 110; user plane data failure events (also referred to as data stall events) on UE device 110; a network slice associated with UE device 110 (e.g., a Single Network Slice Selection Assistance Identifier (S-NSSAI), etc.); a DNN associated with UE device 110; a location associated with UE device 110; frequency bands used by UE device 110; a Radio Access Technology (RAT) type used by UE device 110 (e.g., use of 4G LTE, 5G NR, 5G Non-Standalone Architecture (NSA), 5G Standalone Architecture (SA), Evolved Non-Standalone Dual Connectivity (EN-DC), FR1 and/or FR2 sub-6 GHz bands, etc.); IP Multimedia Subsystem (IMS) registration failure events; call setup failure events (e.g., Voice over LTE (VoLTE) call setup failure events, Voice over NR (VoNR) call setup failure events, etc.); PDU connection success and/or failure rate; percentage of time of 5G SA usage; percentage of time of 5G NSA usage; percentage of time of 4G only usage; and/or other types of operational KPIs.

Operational KPIs triggers field 450 may store, for each operational KPI, one or more trigger events for recording a value for the operational KPI and/or one or more trigger events for reporting a recorded value for the operational KPI. A KPI may be event-based, in which a KPI value is reported in response to a specified event (e.g., a threshold being reached; an error status being detected; a change in connectivity, software, or user activity; etc.), or counter-based, in which case KPI values are recorded based on detected events and in which a counter is maintained each time a KPI value is recorded. For counter-based KPIs, KPI values may be reported when the counter reaches a particular value or at particular time intervals.

The trigger conditions to record a KPI value and/or to report a KP value may include a condition that needs to be satisfied to record and/or report a KPI value. For example, reporting a KPI value, such as a KPI value that includes information identifying a location of UE device 110, may require user permission. As another example, recording and/or reporting a KPI value may use battery life. Therefore, a KPI may be associated with a requirement that the battery life of UE device 110 is above a threshold or that UE device 110 is connected to a charger. As yet another example, recording and/or reporting a KPI value may use network bandwidth. Therefore, a KPI may be associated with a requirement that UE device 110 does not have any active application sessions and/or that the bandwidth being used by UE device 110 is below a bandwidth threshold.

Wellness KPIs field 460 may store information identifying one or more wellness KPIs that UE device 110 is to be instructed to record and report. The wellness KPIs may characterize the wellness of the RF air interface of UE device 110. The wellness KPIs may include, for example, percentage of time of limited service (e.g., when only emergency services were available, etc.); percentage of time of no service; modulation and coding scheme (MCS); channel quality indicator (CQI); MIMO rank indicator (RI); number of MIMO layers; carrier aggregation configuration; a counter for the number of random access channel (RACH) requests sent by UE device 110; a counter for the number of attach requests sent by UE device 110; a counter for the number of tracking area updates (TAUs) associated with UE device 110; a counter for the number of scheduling requests (SRs) associated with UE device 110; a counter for the number of requests for a connection to PDN 160 sent by UE device 110; a counter for the number of carrier aggregation configuration changes associated with UE device 110; a counter for the number of connections to EN-DC and/or NR-NR Dual Connectivity (NR-DC) associated with UE device 110; a counter for the number of Radio Link Failures (RLFs) associated with UE device 110; PUSCH and/or PUCCH transmission power; SR success and failure rate; percentage of time of emergency service coverage; percentage of time of satellite (e.g., Non-Terrestrial Network (NTN) coverage; 5G QoS ID (5QI) associated with UE device 110; and/or other types of wellness KPIs.

Wellness KPIs trigger field 470 may store, for each wellness KPI, one or more trigger events for recording a value for the wellness KPI and/or one or more trigger events for reporting a recorded value for the wellness KPI, similarly as described above for operational KPIs triggers field 450.

Efficiency KPIs field 480 may store information identifying one or more efficiency KPIs that UE device 110 is to be instructed to record and report. The efficiency KPIs may characterize the efficiency of the RF air interface of UE device 110. The efficiency KPIs may include, for example, uplink and/or downlink user perceived throughput (UPTP); receiver reference sensitivity (Rx) for each component carrier on 4G LTE and/or 5G NR; MIMO rank indicator for each component carrier on 4G LTE and/or 5G NR; uplink and/or downlink MIMO assignment percentage for each codeword for each component carrier; uplink and/or downlink modulation for each component carrier on 4G LTE and/or 5G NR; spectrum efficiency; carrier aggregation configuration for each component carrier on 4G LTE and/or 5G NR; 5QI for each component carrier; and/or other types of efficiency KPIs.

Efficiency KPIs triggers field 490 may store, for each efficiency KPI, one or more trigger events for recording a value for the efficiency KPI and/or one or more trigger events for reporting a recorded value for the efficiency KPI, similarly as described above with respect to operational KPIs triggers field 450.

Although FIG. 4 shows exemplary components of UE device DB 315, in other implementations, UE device DB 315 may include fewer components, different components, additional components, or differently arranged components than depicted in FIG. 4.

Figure 5:
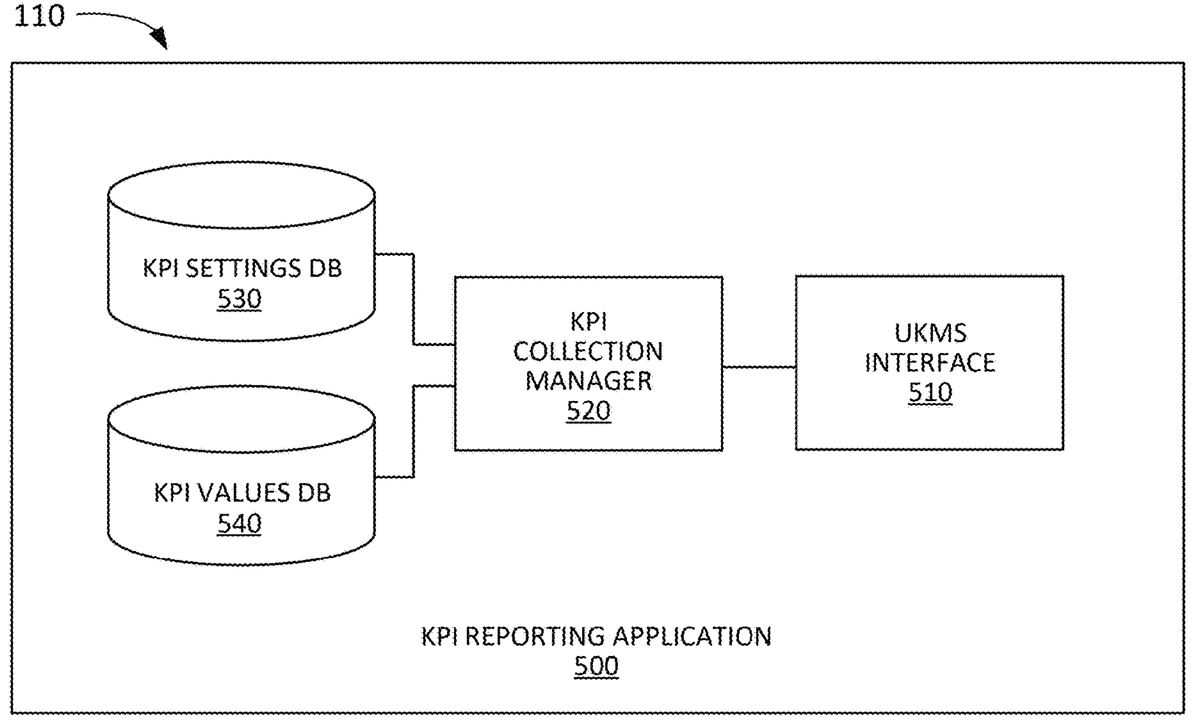
FIG. 5 illustrates exemplary components of a User Equipment (UE) device according to an implementation described herein.

FIG. 5 illustrates exemplary components of a KPI reporting application 500 installed on UE device 110. The components of KPI reporting application 500 may be implemented, for example, via processor 220 executing instructions from memory 230. For example, one or more components of KPI reporting application 500 may correspond to the structure of processor 220 together with instructions in memory 230 for implementing the functionality of the component. Alternatively, some or all of the components of KPI reporting application 500 may be implemented via hard-wired circuitry. For example, one or more components of KPI reporting application 500 may correspond to the structure of some or all of an ASIC, FPGA, and/or another type of integrated circuit. As shown in FIG. 5, KPI reporting application 500 may include a UKMS interface 510, a KPI collection manager 520, a KPI settings DB 530, and a KPI values DB 540.

UKMS interface 510 may be configured to communicate with UKMS 152. For example, UKMS interface 510 may receive instructions from UKMS 152 to record and report values for a set of UE KPIs along with a set of trigger conditions for recording and reporting the UE KPI values. KPI collection manager 520 may receive the instructions and store information relating to which UE KPIs to collect, along with the trigger conditions for recording and reporting the UE KPI values, in KPI settings DB 530. For example, KPI settings DB 530 may store information similar to the information stored in UE device record 400 described above with reference to FIG. 4.

KPI collection manager 520 may record UE KPI values for the set of received UE KPIs based on the received trigger conditions associated with each UE KPI. KPI collection manager 520 may store the collected UE KPI values in KPI values DB 540. KPI collection manager 520 may report the UE KPI values stored in KPI values DB 540 based on one or more reporting trigger conditions.

Although FIG. 5 shows exemplary components of KPI reporting application 500, in other implementations, KPI reporting application 500 may include fewer components, different components, additional components, or differently arranged components than depicted in FIG. 5. Additionally, or alternatively, one or more components of KPI reporting application 500 may perform one or more tasks described as being performed by one or more other components of KPI reporting application 500.

Figure 6:
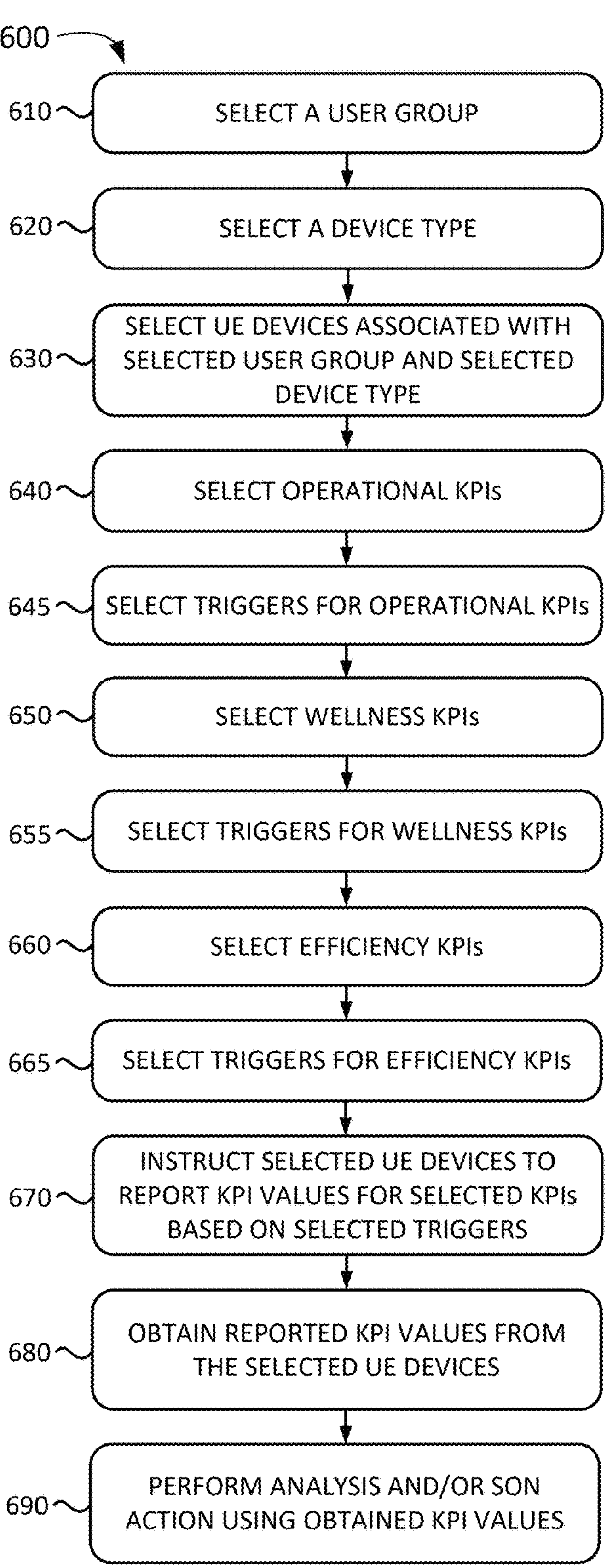
FIG. 6 illustrates a flowchart of a process for selecting and obtaining UE device KPIs according to an implementation described herein.

FIG. 6 illustrates a flowchart of a process for selecting and obtaining UE device KPIs. In some implementations, process 600 of FIG. 6 may be performed by UKMS 152. In other implementations, some or all of process 600 may be performed by another device or a group of devices separate from UKMS 152.

As shown in FIG. 6, process 600 may include selecting a user group (block 610), selecting a device type (block 620), and selecting UE devices associated with the selected user group and selected device type (block 630). For example, UKMS 152 may select a user group and a device type and identify UE devices 110 that are members of the selected user group and are classified as the selected device type.

Process 600 may further include selecting operational KPIs (block 640) and selecting triggers for the selected operational KPIs (block 645). For example, UKMS 152 may select a set of operational KPIs and may determine, for each operational KPI, whether the operational KPI is event-based or counter-based, and/or whether any conditional criteria should be applied for recording and/or reporting the operational KPI.

Process 600 may further include selecting wellness KPIs (block 650) and selecting triggers for the selected wellness KPIs (block 655). For example, UKMS 152 may select a set of wellness KPIs and may determine, for each wellness KPI, whether the wellness KPI is event-based or counter-based, and/or whether any conditional criteria should be applied for recording and/or reporting the wellness KPI.

Process 600 may further include selecting efficiency KPIs (block 660) and selecting triggers for the selected efficiency KPIs (block 665). For example, UKMS 152 may select a set of efficiency KPIs and may determine, for each efficiency KPI, whether the efficiency KPI is event-based or counter-based, and/or whether any conditional criteria should be applied for recording and/or reporting the efficiency KPI.

Process 600 may further include instructing the selected UE devices to report KPI values for the selected KPIs based on the selected triggers (block 670). For example, UKMS 152 may instruct the selected UE devices 110 to report KPI values for the selected operational, wellness, and efficiency KPIs based on one or more recording and/or reporting trigger conditions selected for each KPI.

Process 600 may further include obtaining reported KPI values from the selected UE devices (block 680) and performing analysis and/or a SON action using the obtained KPI values (block 690). For example, UKMS 152 may obtain, at particular intervals, KPI values reported by particular ones of the selected UE devices 110 and store the obtained KPI values in KPI values DB 345. UKMS 152 may provide the stored KPI values to KPI analytics system 154. KPI analytics system 154 may use the received UE KPI values to perform anomaly detection based on the obtained KPI values, compare the obtained KPI values with a set of KPI values obtained by the core network, identify a trend in operational performance, wellness, and/or efficiency, generate a test report based on a testing group of UE devices, and/or perform a different type of analysis.

As another example, UKMS 152 may perform a SON action based on the obtained KPI values, or send an instruction to SON system 156 to perform the SON action based on the obtained KPI values. UKMS 152 may analyze the received KPI values and determine a SON action to perform based on the received KPI values. The SON action may include an action to change a configuration of RAN 120, an action to change a configuration of core network 150, and/or an instruction to UE device 110 to perform an action to improve the signal quality experienced by UE device 110. Examples of such SON actions may include adjusting a tilt parameter for an antenna of base station 130, instructing base station 130 to enter a power saving mode, adjust power allocation for base station 130, instruct base station 130 to switch to using a different frequency band, adjust a handover control parameter used by base station 130, load balance traffic between different frequency bands of base station 130, perform interference mitigation between UE devices 110 and/or base stations 130, adjust a carrier aggregation parameter for base station 130, identify an error state or an outage associated with base station 130, deploying additional instances of a microservice for an NF, deploying a new instance of an NF, detecting an outage of an NF, detecting outage of a link in the core network, routing a data flow and/or a PDU session to a different destination, instructing UE device 110 to adjust an antenna parameter, enter a power saving mode, update an application, update a URSP, request to connect to a different network slice, adjust a handover control parameter, and/or perform another type of SON action.

Figure 7:
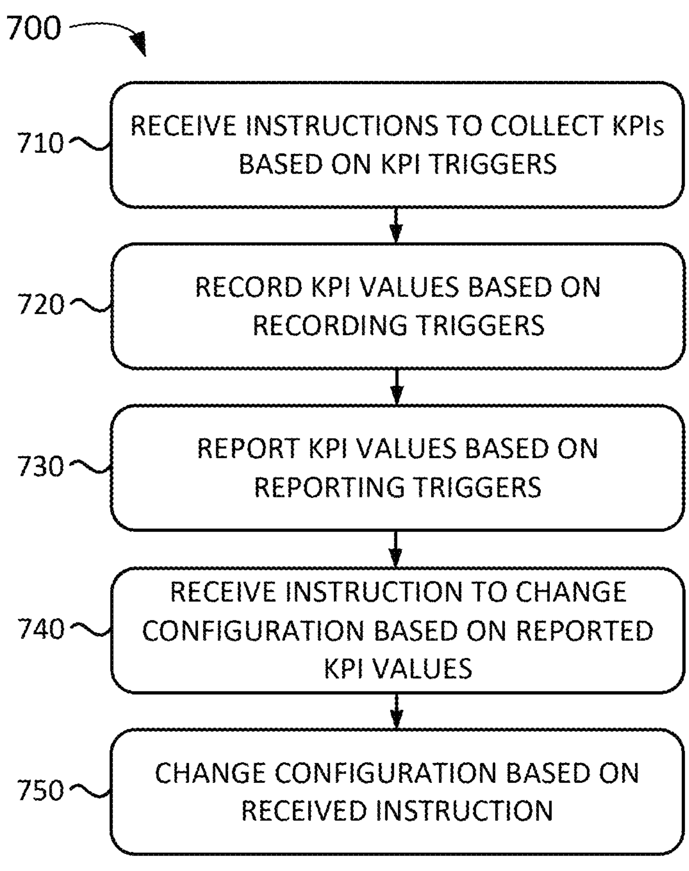
FIG. 7 illustrates a flowchart of a process for reporting UE device KPIs according to an implementation described herein.

FIG. 7 illustrates a flowchart of a process for reporting UE device KPIs. In some implementations, process 700 of FIG. 7 may be performed by UE device 110. In other implementations, some or all of process 700 may be performed by another device or a group of devices separate from UE device 110.

As shown in FIG. 7, process 700 may include receiving instructions to collect KPIs based on KPI triggers (block 710). For example, UE device 110 may receive instructions from UKMS 152 to record and report values for a set of UE KPIs along with a set of trigger conditions for recording and reporting the UE KPI values. KPI reporting application 500 may store information relating to which UE KPIs to collect, along with the trigger conditions for recording and reporting the UE KPI values, in KPI settings DB 530.

Process 700 may further include recording KPI values based on the recording triggers (block 720) and reporting the recorded KPI values based on the reporting triggers (block 730). For example, KPI reporting application 500 may record KPI values for the set of received KPIs based on the received recording trigger conditions associated with each KPI, store the collected KPI values, and report the stored KPI values based on one or more reporting trigger conditions.

Process 700 may further include receiving an instruction to change a configuration based on the reported KPI values (block 740) and changing the configuration based on the received instruction (block 750). For example, UE device 110 may receive an instruction from UKMS 152 to change a configuration of UE device 110 based on a SON action selected by UKMS 152 in response to the reported KPI values. UE device 110 may perform an action to change the configuration based on the received instruction. The action performed by UE device 110 may include, for example, adjusting an antenna parameter, entering a power saving mode, updating an application, updating an URSP, requesting to connect to a different network slice, adjusting a handover control parameter, and/or performing another type of action.

FIG. 8 illustrates a first exemplary KPI set 800 of UE device KPIs. KPI set 800 may be associated with user group 810 of consumer customers with UE devices 110 classified as device type 820 of mobile broadband UE devices. As shown in FIG. 8, KPI set 800 may include a set of operational KPIs 830 that includes a set of event triggered KPIs 832 and a set of counter triggered KPIs 834. Event triggered KPIs 832 may include RSRP and/or SINR for each component carrier, PUSCH and/or PUCCH transmission power, ARFCN for each component carrier, boot time, modem crash events, modem online/offline events, and user data plane failure. Counter triggered KPIs 834 may include percentage of time of 5G SA service, percentage of time of 5G NSA service, and percentage of time of 4G only service.

KPI set 800 may further include a set of wellness KPIs 840 that includes a set of event triggered KPIs 842. Event triggered KPIs 842 may include percentage of time of limited service and percentage of time of no service. KPI set 800 may further include a set of efficiency KPIs 850 that includes a set of counter triggered KPIs 852. Counter triggered KPIs 852 may include downlink (DL) and/or uplink (UL) user perceived throughput, Rx for each component carrier, the MIMO rank indicator for each component carrier, DL and/or UL MIMO assignment for each component carrier, and DL and/or UL modulation for each component carrier.

FIG. 9 illustrates a second exemplary set 900 of UE device KPIs. KPI set 900 may be associated with user group 910 of a testing group with UE devices 110 classified as device type 920 of mobile broadband UE devices and FWA devices. As shown in FIG. 9, KPI set 900 may include a set of operational KPIs 930 that includes a set of event triggered KPIs 932. Event triggered KPIs 932 may include RSRP and/or SINR for each component carrier, a RAT type, boot time, registration failure, call setup failure rate, modem crash events, PDU setup failure rate, and a user data plane failure rate.

KPI set 900 may further include a set of wellness KPIs 940 that includes a set of event triggered KPIs 942 and a set of counter triggered KPIs 944. Event triggered KPIs 942 may include MCS, CQI, rank indicator, and carrier aggregation. Counter triggered KPIs 944 may include a set of counters (e.g., a RACH counter, an attach requests counter, a TAU counter, an SR counter, a PDN connection request counter, an EN-DC connection counter, an NR-DC connection counter, an RLF counter, etc.), and percentage of time of service. KPI set 900 may further include a set of efficiency KPIs 950 that includes a set of event triggered KPIs 952. Event triggered KPIs 952 may include DL and/or UL user perceived throughput, carrier aggregation, MIMO layers, and spectrum utilization.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

selecting, by a device, a plurality of user equipment (UE) devices associated with a user group and a device type, wherein the plurality of UE devices connect to a core network via a Radio Access Network (RAN);

selecting, by the device, a plurality of key performance indicator (KPI) parameters to be collected by particular ones of the plurality of UE devices;

instructing, by the device, the plurality of UE devices to report values for the plurality of KPI parameters;

obtaining, by the device, the reported values for the plurality of KPI parameters from the plurality of UE devices; and performing, by the device, a Self-Organizing Network (SON) action to change a configuration of the RAN based on the obtained values for the plurality of KPI parameters, wherein performing the SON action includes:

executing the SON action by the device; or sending, by the device, an instruction to a SON system to perform the SON action.

2. The method of claim 1, wherein selecting the plurality of UE devices associated with the user group and the device type includes selecting UE devices associated with a device type, wherein the device type corresponds to at least one of:

mobile broadband UE devices using a particular mobile operating system;

fixed wireless access devices;

Internet of Things (IoT) devices;

laptop computer devices with cellular wireless communication capability;

unmanned aerial vehicle (UAV) devices; or mass transit wireless access devices.

3. The method of claim 1, wherein selecting the plurality of UE devices associated with the user group and the device type includes selecting UE devices associated with a user group, wherein UE devices associated with the user group include at least one of:

UE devices provided to employees of an organization;

UE devices that have installed a particular application;

UE devices located in a geographic location; or

UE devices associated with a testing group.

4. The method of claim 1, wherein selecting the plurality of KPI parameters to be collected by particular ones of the plurality of UE devices includes:

selecting a first plurality of KPI parameters to characterize operation of a radio frequency (RF) air interface;

selecting a second plurality of KPI parameters to characterize a wellness of the RF air interface; and selecting a third plurality of KPI parameters to characterize an efficiency of the RF air interface.

5. The method of claim 1, wherein instructing the plurality of UE devices to report values for the plurality of KPI parameters includes:

selecting one or more trigger events for recording a value for a particular one of the plurality of KPI parameters; and selecting a reporting criterion for the particular one of the plurality of KPI parameters.

6. The method of claim 5, wherein the reporting criterion corresponds to the one or more trigger events.

7. The method of claim 5, wherein the reporting criterion corresponds to a counter value for a counter that is incremented each time the one or more trigger events are detected.

8. The method of claim 5, wherein the one or more trigger events include a conditional event to be satisfied for recording the value for the particular one of the plurality of KPI parameters, wherein the conditional event includes at least one of:

a battery status associated with a UE device;

a user permission setting associated with the UE device; or an activity level associated with the UE device.

9. The method of claim 1, wherein performing the SON action to change the configuration of the RAN based on the obtained values for the plurality of KPI parameters includes at least one of:

adjusting an antenna tilt parameter;

instructing a base station to enter a power saving mode;

adjusting a power allocation for the base station;

instructing the base station to use a particular frequency band;

load balancing traffic between different frequency bands used by the base station;

performing interference mitigation with respect to the base station;

adjusting a carrier aggregation parameter for the base station; or identifying an error state associated with the base station.

10. A device comprising:

a processor configured to:

select a plurality of user equipment (UE) devices associated with a user group and a device type, wherein the plurality of UE devices connect to a core network via a Radio Access Network (RAN);

select a plurality of key performance indicator (KPI) parameters to be collected by particular ones of the plurality of UE devices;

instruct the plurality of UE devices to report values for the plurality of KPI parameters;

obtain the reported values for the plurality of KPI parameters from the plurality of UE devices; and perform a Self-Organizing Network (SON) action to change a configuration of the RAN or the core network based on the obtained values for the plurality of KPI parameters wherein, when performing the SON action, the processor is configured to:

execute the SON action by the device; or send an instruction to a SON system to perform the SON action.

11. The device of claim 10, wherein, when selecting the plurality of UE devices associated with the user group and the device type, the processor is further configured to select UE devices associated with a device type, and wherein the device type corresponds to at least one of:

mobile broadband UE devices using a particular mobile operating system;

fixed wireless access devices;

Internet of Things (IoT) devices;

laptop computer devices with cellular wireless communication capability;

unmanned aerial drone (UAV) devices; or mass transit wireless access devices.

12. The device of claim 10, wherein, when selecting the plurality of UE devices associated with the user group and the device type, the processor is further configured to select UE devices associated with a user group, and wherein UE devices associated with the user group include at least one of:

UE devices provided to employees of an organization;

UE devices that have installed a particular application;

UE devices located in a geographic location; or

UE devices associated with a testing group.

13. The device of claim 10, wherein, when selecting the plurality of KPI parameters to be collected by particular ones of the plurality of UE devices, the processor is further configured to:

select a first plurality of KPI parameters to characterize operation of a radio frequency (RF) air interface;

select a second plurality of KPI parameters to characterize a wellness of the RF air interface; and select a third plurality of KPI parameters to characterize an efficiency of the RF air interface.

14. The device of claim 10, wherein, when instructing the plurality of UE devices to report values for the plurality of KPI parameters, the processor is further configured to:

select one or more trigger events for recording a value for a particular one of the plurality of KPI parameters; and select a reporting criterion for the particular one of the plurality of KPI parameters.

15. The device of claim 14, wherein the reporting criterion corresponds to the one or more trigger events.

16. The device of claim 14, wherein the reporting criterion corresponds to a counter value for a counter that is incremented each time the one or more trigger events is detected.

17. The device of claim 14, wherein the one or more trigger events include a conditional event to be satisfied for recording the value for the particular one of the plurality of KPI parameters, wherein the conditional event includes at least one of:

a battery status associated with a UE device;

a user permission setting associated with the UE device; or an activity level associated with the UE device.

18. The device of claim 10, wherein, when providing the obtained values for the plurality of KPI parameters for a statistical analysis of the user group and device type, the processor is configured to at least one of:

perform anomaly detection based on the obtained values for the plurality of KPI parameters; or compare the obtained values for the plurality of KPI parameters with a set of KPI values obtained by the core network.

19. A non-transitory computer-readable memory device storing instructions executable by a processor, the non-transitory computer-readable memory device comprising:

one or more instructions to select a plurality of user equipment (UE) devices associated with a user group and a device type, wherein the plurality of UE devices connect to a core network via a Radio Access Network (RAN);

one or more instructions to select a plurality of key performance indicator (KPI) parameters to be collected by particular ones of the plurality of UE devices;

one or more instructions to instruct the plurality of UE devices to report values for the plurality of KPI parameters;

one or more instructions to obtain the reported values for the plurality of KPI parameters from the plurality of UE devices; and one or more instructions to perform a Self-Organizing Network (SON) action to change a configuration of the RAN based on the obtained values for the plurality of KPI parameters, wherein the one or more instructions to perform the SON action include:

one or more instructions to execute the SON action; or one or more instructions to send an instruction to a SON system to perform the SON action.

20. The non-transitory computer-readable memory device of claim 19, wherein the one or more instructions to select the plurality of KPI parameters to be collected by particular ones of the plurality of UE devices further include:

one or more instructions to select a first plurality of KPI parameters to characterize operation of a radio frequency (RF) air interface;

one or more instructions to select a second plurality of KPI parameters to characterize wellness of the RF air interface; and one or more instructions to select a third plurality of KPI parameters to characterize an efficiency of the RF air interface.

* * * * *